United States Patent
Mi et al.

(10) Patent No.: US 8,335,095 B2
(45) Date of Patent: Dec. 18, 2012

(54) ONE CYCLE CONTROL METHOD FOR POWER FACTOR CORRECTION

(75) Inventors: Xuetao Mi, Guangdong (CN); Qingfeng Guo, Guangdong (CN); Min Xu, Guangdong (CN)

(73) Assignee: Gree Electric Appliances, Inc. of Zhuhai, Zhuhai, Guangdong (CN)

( * ) Notice: Subject to any disclaimer, the term of this patent is extended or adjusted under 35 U.S.C. 154(b) by 111 days.

(21) Appl. No.: 13/128,610

(22) PCT Filed: Sep. 14, 2009

(86) PCT No.: PCT/CN2009/001026
§ 371 (c)(1),
(2), (4) Date: May 10, 2011

(87) PCT Pub. No.: WO2010/054529
PCT Pub. Date: May 20, 2010

(65) Prior Publication Data
US 2011/0216565 A1 Sep. 8, 2011

(30) Foreign Application Priority Data
Nov. 11, 2008 (CN) .......................... 2008 1 0219009

(51) Int. Cl.
*H02M 5/42* (2006.01)
*G05F 1/70* (2006.01)
(52) U.S. Cl. .............................. 363/84; 363/89; 323/211
(58) Field of Classification Search ................... 363/44, 363/79, 80, 84, 89, 126; 323/205, 207, 211, 323/222
See application file for complete search history.

(56) References Cited

U.S. PATENT DOCUMENTS
5,278,490 A 1/1994 Smedley
(Continued)

FOREIGN PATENT DOCUMENTS
CN 101404446 A 4/2009

OTHER PUBLICATIONS
Wang Kuang et al., The Research on Power Factor Correction Based on "One-cycle Control". Telecom Power Technologies, May 25, 2008, p. 17-19, vol. 25, No. 3.

*Primary Examiner* — Adolf Berhane
(74) *Attorney, Agent, or Firm* — Morris, Manning & Martin, LLP; Tim Tingkang Xia, Esq.

(57) ABSTRACT

A one cycle control method for power factor correction based on a boost circuit and a main control chip of system comprises the steps of: (1) Determining whether soft-start ends or not; if the soft-start ends, processing step (2) directly, if not, increasing reference value $U_{ref}$ of output voltage and then processing step (2); (2) Reading sampling output voltage $U_o$, and sampling inductive current $i_g$ according to A/D sampling triggering instant; (3) Calculating duty ratio of PWM signal for driving the switch transistor; (4) Outputting PWM signal; (5) Calculating the next A/D sampling triggering instant according to the duty ratio of PWM signal; (6) Returning to step (2). The present invention can implement the function of power factor correction by integrating the software of the method into the main control chip of the existing system and cooperating with the simple boost circuit, without using the traditional circuit for power factor correction and the specific one cycle control chip for PFC, which reduces the cost of the system. Also the present invention ensures the sampling data true and correct, and the stable operation of system, by simple processing of the sampling triggering instant.

6 Claims, 3 Drawing Sheets

U.S. PATENT DOCUMENTS

| | | | | |
|---|---|---|---|---|
| 5,986,901 A * | 11/1999 | Weng | | 363/44 |
| 6,657,417 B1 * | 12/2003 | Hwang | | 323/222 |
| 6,751,108 B2 * | 6/2004 | Elferich et al. | | 363/84 |
| 7,164,591 B2 * | 1/2007 | Soldano | | 363/89 |
| 7,643,317 B2 * | 1/2010 | Katoh et al. | | 363/44 |
| 7,906,941 B2 * | 3/2011 | Jayaraman et al. | | 323/222 |
| 7,929,323 B2 * | 4/2011 | Schmidt | | 363/52 |
| 8,008,898 B2 * | 8/2011 | Melanson et al. | | 323/222 |
| 2008/0316779 A1 * | 12/2008 | Jayaraman et al. | | 363/74 |
| 2010/0309697 A1 * | 12/2010 | Werle et al. | | 363/126 |
| 2011/0018453 A1 * | 1/2011 | Hasegawa et al. | | 315/224 |
| 2012/0044725 A1 * | 2/2012 | Wrathall | | 363/45 |

* cited by examiner

ONE CYCLE CONTROL METHOD FOR POWER FACTOR CORRECTION

TECHNICAL FIELD

The present invention relates to power supply techniques, more particularly, to a one cycle control method for power factor correction based on a boost circuit.

BACKGROUND OF THE INVENTION

A Power Factor Correction (PFC) circuit is used for reducing the input harmonic current. However, the traditional PFC circuit has complicated techniques and design, and high component count, which makes it large in size and high in cost. So the design of the PFC circuit often makes a compromise between performance and cost.

In recent years, the studies of the one cycle control method for PFC focus on how to simplify the structure of the traditional control circuit for PFC, so as to avoid sampling the input voltage and eliminate the complicated analog multiplier. While the one cycle control circuit for PFC solves these problems very well. So far, one cycle control chips for PFC have been developed and applied, such as the one cycle control continuous conduction mode PFC boost converter integrated circuit with power switch and boost converter disclosed in Chinese patent No. 200380109048.6. Although one cycle control chips for PFC are simple and reliable, the cost-to-use is too high.

It is known that many systems are controlled by main control chips such as DSP. DSP and other main control chips have powerful capacity of software integration, compatibility and signal processing, so it will be an increase of cost and a waste of resources as well if a specific one cycle control chip for PFC is additionally applied in such system. For example, power factor correction techniques are applied broadly to the power supplies of compressor in the field of air conditioner, and a main control chip has been integrated in the main control board of the compressor, so it is necessary to develop corresponding techniques to avoid using specific high cost one cycle control chips for PFC.

SUMMARY OF THE INVENTION

The present invention aims at providing a one cycle control method for power factor correction, which can be integrated into the main control chip of system by software, so as to realize the one cycle control strategy efficiently by cooperating with a simple boost circuit.

The present invention is carried out by the following technical scheme:

A one cycle control method for power factor correction is based on a boost circuit and a main control chip of system. The boost circuit comprises an AC input, a rectifying circuit, an inductor, fast recovery diodes, a capacitor, a DC output, an inductive current sampling circuit, an output voltage sampling circuit, a switch transistor and a driving circuit of the switch transistor. The one cycle control method for power factor correction comprises the steps as follows:

(1) Determining whether soft-start ends or not; if the soft-start ends, processing step (2) directly, if not, increasing reference value $U_{ref}$ of output voltage and then processing step (2);

(2) Reading sampling output voltage $U_o$ and sampling inductive current $i_g$ according to A/D sampling triggering instant;

(3) Calculating as follows duty ratio of PWM signal for driving the switch transistor:

Calculating $u_1$ and $u_2$ according to Equation of $$\begin{cases} u_1(t) = \dfrac{i_g(nT)R_s}{u_m(nT)} \\ u_2(t) = \dfrac{1}{T}\int_0^\tau 1\, d\tau \end{cases} \quad 0 \le t \le T \quad 0 \le \tau \le t$$

in which $R_s$ is an equivalent current detection resistance, $u_m$ is an output of a PI regulator by regulating difference between the reference value $U_{ref}$ of the output voltage and the sampling output voltage $U_o$; obtaining the duty ratio of PWM signal;

(4) Outputting PWM signal;

(5) Calculating the next A/D sampling triggering instant according to the duty ratio of PWM signal;

(6) Returning to step (2).

The advantages of the present invention over the prior art are as follows: the function of power factor correction can be implemented by integrating the software of the method into the main control chip (DSP, for example) of system and cooperating with the simple boost circuit, without using the traditional circuit for power factor correction and the specific one cycle control chip for PFC, which reduces the cost of the system; more especially, the present invention avoids sampling around the switching instant by calculating the sampling triggering instant, which ensures the sampling data true and correct, further ensures the optimal effect of PWM control signals and the stable operation of system.

DETAILED DESCRIPTION OF THE PREFERRED EMBODIMENTS

Figure 1:
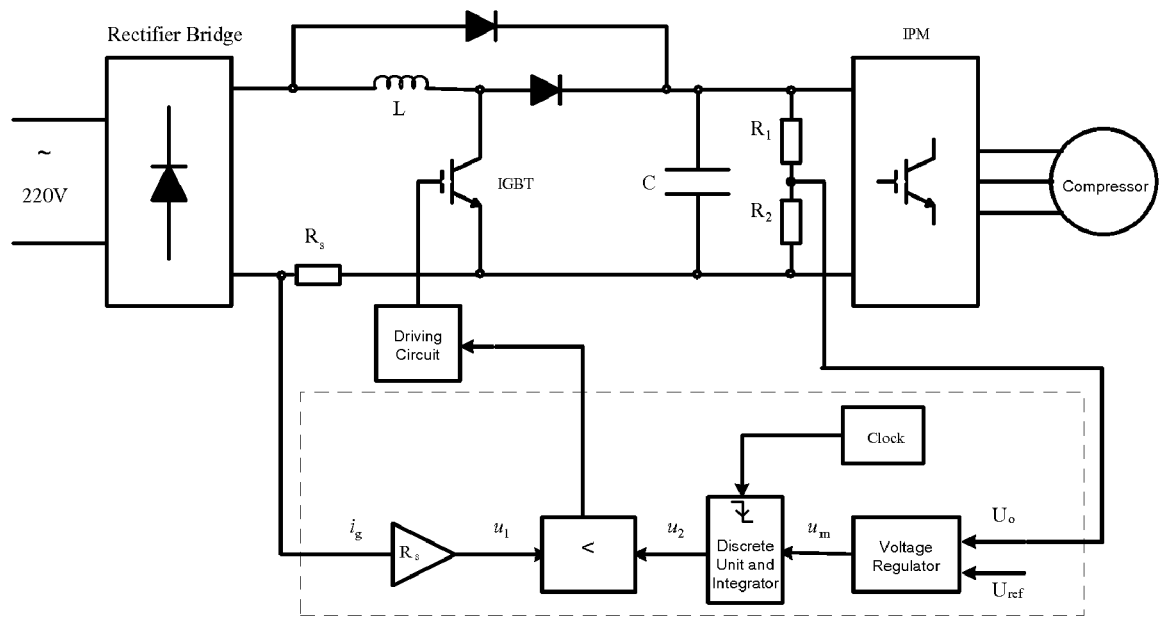
FIG. 1 is a schematic view illustrating a one cycle control system for Power Factor Correction based on the boost circuit.

As shown in FIG. 1, the method according to the present invention is based on the boost circuit and the main control chip of system. The boost circuit is an accustomed circuit which comprises an AC input, a rectifying circuit, an inductor, fast recovery diodes, a capacitor, a DC output, an inductive current sampling circuit, an output voltage sampling circuit, a switch transistor (IBGT or MOSFET) and a driving circuit of the switch transistor. The part outlined in a dashed frame is a control module corresponding to the method of the present invention, which is integrated in the main control chip.

The principle of the one cycle control method for PFC will be described with reference to FIG. 1. The one cycle control for PFC aims at getting the inductive current follow the wave of the input rectified voltage $u_g$ and ensuring the output voltage $U_o$ to be stabilized at the given value. If the inductive current is proportional to the input voltage and has the same phase as the input voltage under the control of the control module, the whole rectifying circuit can be equivalent as a resistor, and then $$u_g = R_e i_g \quad (1)$$

In which $R_e$ is the equivalent resistance of the rectifying circuit, $i_g$ is an instantaneous value of the inductive current and $u_g$ is an instantaneous value of the input half sine-wave rectified voltage. In one cycle, the relation of the input voltage $u_g$, the output voltage $U_o$ and the turn-on duty ratio d of the switch transistor of the PFC boost circuit is as follows:

$$u_g = U_o(1-d) \quad (2)$$

Eq. 2 can be written as $R_e i_g = U_o(1-d)$. $R_s$ is defined as an equivalent current detection resistance of the PFC boost circuit and then Eq. 2 can be written as:

$$R_s i_g = U_o \frac{R_s}{R_e}(1-d) \quad (3)$$

If $$u_m = U_o \frac{R_s}{R_e},$$

then Eq. 3 can be simplified as:

$$R_s i_g = u_m \bar{d}. \quad (4)$$

In which $\bar{d}=1-d$ is the turn-off duty ratio for the switch transistor. If the turn-off duty ratio $\bar{d}$ satisfies Eq. 4. then the inductive current $i_g$ can follow the input half sine-wave rectified voltage $u_g$. Let T be the switching cycle of the PFC boost circuit and discretize Eq. 4. When the carrier frequency far outweighs the frequency of the inductive input voltage, the inductive current and the regulating voltage keep mostly constant in one switching cycle.

$$\begin{cases} u_1(t) = i_g(t)R_s = i_g(nT)R_s \\ u_2(t) = \frac{1}{T}\int_0^t u_m(nT)d\tau \end{cases} \quad 0 \le t \le T \quad 0 \le \tau \le t \quad (5)$$

The $u_m$ in Eq. 5 is different in different switching cycle, so it is difficult to obtain the result with the main control chip of system. For the reason that $u_m$ and $i_g$ keep constant in one switching cycle, Eq. 5 is modified as follows:

$$\begin{cases} u_1(t) = \frac{i_g(nT)R_s}{u_m(nT)} \\ u_2(t) = \frac{1}{T}\int_0^t 1 d\tau \end{cases} \quad 0 \le t \le T \quad 0 \le \tau \le t \quad (6)$$

$u_2(t)$ is generated by a counter of DSP. If $u_1(t)<u_2(t)$, then the switch transistor turns on, or else the switch transistor turns off.

Figure 2:
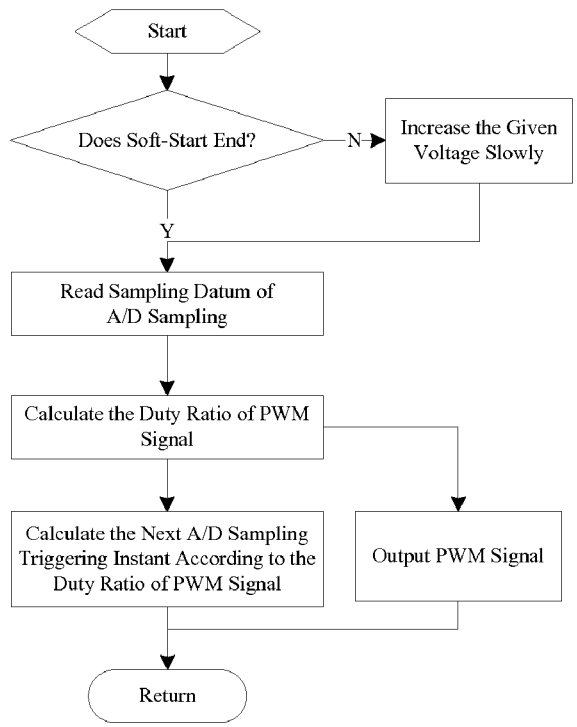
FIG. 2 is a flow chart illustrating the one cycle control method for power factor correction n according to the present invention.

Specific control program of the one cycle control method for PFC of the present invention will be described below. As shown in FIG. 2, the control program comprises steps as follows:

1. Determine whether soft-start ends or not; if the soft-start ends, process step 1 directly; if not, increase reference value $U_{ref}$ of the output voltage (namely increase the given voltage slowly as shown in FIG. 2) and then process step 2;
2. Read sampling busvoltage $U_o$ and sampling inductive current $i_g$ according to A/D sampling triggering instant;
3. Calculate as follows the duty ratio of PWM signal for driving the switch transistor:
    calculate $u_1$ and $u_2$ according to Eq. 6. in which $u_2$ is generated by a counter of the main control chip of system such as DSP, $R_s$ is the equivalent current detection resistance, $u_m$ is an output of a PI regulator by regulating the difference between the reference value $U_{ref}$ of the output voltage and the sampling output voltage $U_o$; and obtain the duty ratio of PWM signal;
4. Output PWM signal;
5. Calculate the next A/D sampling triggering instant according to the duty ratio of PWM signal;
6. Return to step 2.

Figure 3:
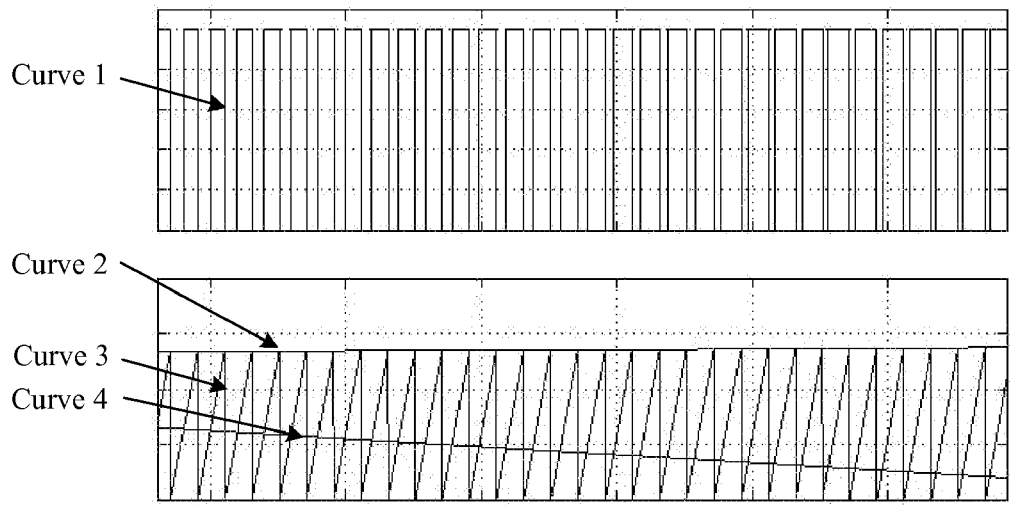
FIG. 3 illustrates waveforms of signals $u_1$, $u_2$, $u_m$ and PWM control signal involved in the one cycle control method for power factor correction according to the present invention.

As shown in FIG. 3, curve 1 represents pulse signal generated by comparing $u_1$ with $u_2$, curve 2 represents $u_m(nT)$, curve 3 represents $u_2$ and curve 4 represents $u_1$. It can be seen that, in one cycle, PWM outputs high-level voltage if $u_1$ is less than $u_2$, or else PWM outputs low-level voltage. Thus pulse signal is generated periodically, which makes the inductive current $i_g$ follow the wave of the input rectified voltage $u_g$.

Figure 4:
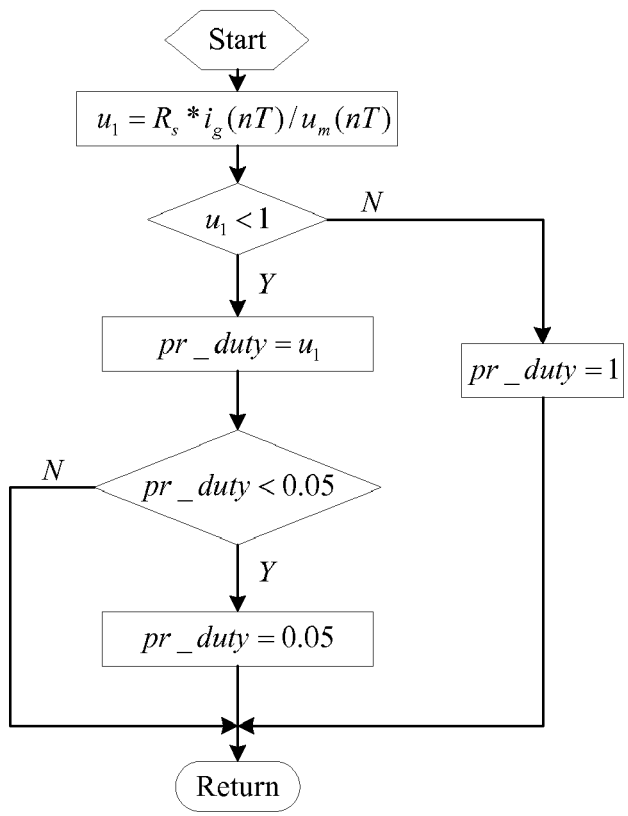
FIG. 4 is a flow chart illustrating the first way for calculating the duty ratio of the PWM control signal.
Figure 5:
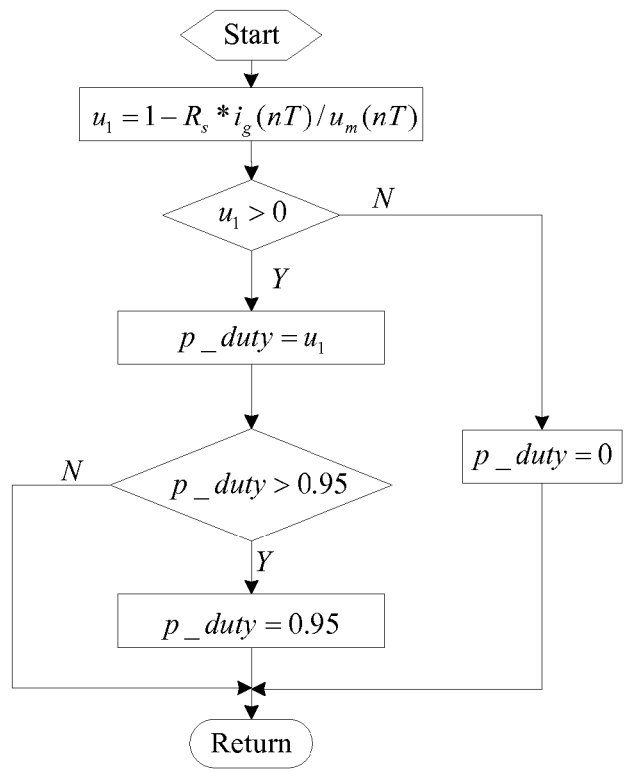
FIG. 5 is a flow chart illustrating the second way for calculating the duty ratio of the PWM control signal.

The present invention provides two ways for calculating the duty ratio of PWM signal. Eq. 6 illustrates the first way. FIG. 4 is a flow chart illustrating the first way for calculating the duty ratio of the PWM control signal, in which pr_duty is the turn-off duty ratio for the switch transistor. Calculate $u_1$ first and determine whether $u_1$ is greater than or equal to the maximum turn-off duty ratio for the switch transistor of 1 or not. If $u_1$ is greater than or equal to 1. pr_duty is the maximum of 1. Or else pr_duty is equal to $u_1$, and then determine whether pr_duty is less than the minimum turn-off duty ratio for the switch transistor of 0.05 or not; if pr_duty is less than the minimum, pr_duty is the minimum of 0.05. FIG. 5 is a flow chart illustrating the second way for calculating the duty ratio, in which p_duty is the turn-on duty ratio for the switch transistor. Calculate $u_1$ first and determine whether $u_1$ is less than or equal to the minimum turn-on duty ratio for the switch transistor of 0 or not. If $u_1$ is less than or equal to 0. p_duty is the minimum of 0. Or else p_duty is equal to $u_1$; and then determine whether p_duty is greater than the maximum turn-on duty ratio for the switch transistor of 0.95 or not; if p_duty is greater than the maximum, pr_duty is the maximum of 0.95.

Since only one sampling is performed in one switching cycle in the one cycle control method for PFC, it must be noted that the sampling triggering instant selected should be away from switching instant for the reason that a peak of the inductive current will be generated when the switch transistor turns on or turns off, otherwise the system will be unstable. In order to solve this problem, the sampling triggering instant is selected at an intermediate instant of the longer turn-on time or turn-off time of the switch transistor.

Figure 6:
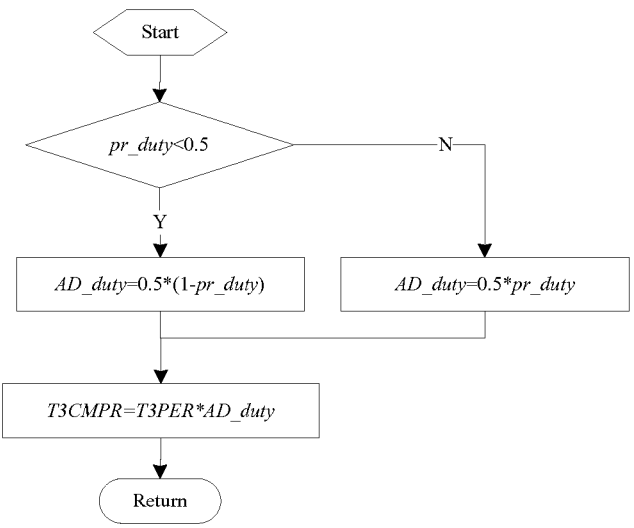
FIG. 6 illustrates a block diagram for calculating A/D sampling triggering instant.

FIG. 6 illustrates a block diagram for calculating A/D sampling triggering instant, in which pr_duty is the turn-off duty ratio for the switch transistor, T3CMPR is a comparison value of a compare register, T3PER is the period of the compare register, AD_duty is the duty ratio of PWM output by a general timer of the main control chip of system. Firstly, determine the turn-on time of the switch transistor according to the duty ratio of PWM signal for driving the switch transistor. If the turn-on time of the switch transistor is longer than that of the turn-off time, the sampling triggering instant is selected at an intermediate instant of the turn-on time, or else the sampling triggering instant is selected at an intermediate instant of the turn-off time. The sampling triggering instant shown in FIG. 6 is selected at the right middle instant of the corresponding time. In fact the sampling triggering instant may be selected within an intermediate period of time. It is preferred in the present invention that the sampling triggering instant is selected between 50 percent and 80 percent of the turn-on time or the turn-off time of the switch transistor. The A/D sampling triggering instant obtained will trigger the next A/D sampling.

What is claimed is:

1. A one cycle control method for power factor correction based on a boost circuit and a main control chip of system, the boost circuit comprising an AC input, a rectifying circuit, an inductor, fast recovery diodes, a capacitor, a DC output, an inductive current sampling circuit, an output voltage sampling circuit, a switch transistor and a driving circuit of the switch transistor; the control method comprises the steps of:
   (1) Determining whether soft-start ends or not; if the soft-start ends, processing step (2) directly, if not, increasing reference value $U_{ref}$ of output voltage and then processing step (2);
   (2) Reading sampling output voltage $U_o$ and sampling inductive current $i_g$ according to A/D sampling triggering instant;
   (3) Calculating as follows duty ratio of PWM signal for driving the switch transistor:
   Calculating $u_1$ and $u_2$ according to Equation of $$\begin{cases} u_1(t) = \dfrac{i_g(nT)R_s}{u_m(nT)} \\ u_2(t) = \dfrac{1}{T}\displaystyle\int_0^\tau 1\,d\tau \end{cases} \quad 0 \le t \le T \quad 0 \le \tau \le t$$

in which $R_s$ is an equivalent current detection resistance, $u_m$ is an output of a PI regulator by regulating difference between the reference value $U_{ref}$ of the output voltage and the sampling output voltage $U_o$; obtaining the duty ratio of PWM signal ;
   (4) Outputting PWM signal;
   (5) Calculating the next A/D sampling triggering instant according to the duty ratio of PWM signal;
   (6) Returning to step (2).

2. The one cycle control method for power factor correction according to claim 1, wherein calculating the duty ratio of PWM signal for driving the switch transistor in step (3) further comprises the steps of:
   determining whether $u_1$ is greater than or equal to the maximum turn-off duty ratio for the switch transistor of 1 or not; if $u_1$ is greater than or equal to 1, pr_duty being the maximum of 1; or else, pr_being equal to $u_1$, determining whether pr_duty is less than the minimum turn-off duty ratio for the switch transistor of 0.05 or not, if pr_duty is less than the minimum, pr_being the minimum of 0.05; in which pr_is the turn-off duty ratio for the switch transistor.

3. The one cycle control method for power factor correction according to claim 1, wherein calculating the duty ratio of PWM signal for driving the switch transistor in step (3) further comprises the steps of:
   determining whether $u_1$ is less than or equal to the minimum turn-on duty ratio for the switch transistor of 0 or not; if $u_1$ is less than or equal to 0, p_duty being the minimum of 0; or else, p_duty being equal to $u_1$, determining whether p_duty is greater than the maximum turn-on duty ratio for the switch transistor of 0.95 or not, if p_duty is greater than the maximum, pr_being the maximum of 0.95; in which p duty is the turn-on duty ratio for the switch transistor.

4. The one cycle control method for power factor correction according to claim 2, wherein calculating the next A/D sampling triggering instant according to the duty ratio of PWM signal in step (5) further comprises the steps of:
   determining the turn-on time of the switch transistor according to the duty ratio of PWM signal for driving the switch transistor; if the turn-on time of the switch transistor is longer than that of the turn-off time, the sampling triggering instant being selected between 50 percent and 80 percent of the turn-on time; or else, the sampling triggering instant being selected between 50 percent and 80 percent of the turn-off time.

5. The one cycle control method for power factor correction according to claim 1, wherein $u_2$ in step (3) is generated by a counter of a main control chip of system such as DSP.

6. The one cycle control method for power factor correction according to claim 3, wherein calculating the next A/D sampling triggering instant according to the duty ratio of PWM signal in step (5) further comprises the steps of:
   determining the turn-on time of the switch transistor according to the duty ratio of PWM signal for driving the switch transistor; if the turn-on time of the switch transistor is longer than that of the turn-off time, the sampling triggering instant being selected between 50 percent and 80 percent of the turn-on time; or else, the sampling triggering instant being selected between 50 percent and 80 percent of the turn-off time.

* * * * *